United States Patent [19]

Commins

[11] Patent Number: 4,717,279
[45] Date of Patent: * Jan. 5, 1988

[54] BUCKET HANGER

[75] Inventor: Alfred D. Commins, Danville, Calif.

[73] Assignee: Simpson Strong-Tie Company, Inc., San Leandro, Calif.

[*] Notice: The portion of the term of this patent subsequent to May 19, 2004 has been disclaimed.

[21] Appl. No.: 40,945

[22] Filed: Apr. 21, 1987

[51] Int. Cl.$^4$ .............................................. F16B 5/06
[52] U.S. Cl. ................................. 403/187; 403/232.1
[58] Field of Search ................. 403/232.1, 279, 237, 403/187, 188; 52/714, 712

[56] References Cited

U.S. PATENT DOCUMENTS

| | | | |
|---|---|---|---|
| 598,135 | 2/1898 | Butz | 403/232.1 |
| 625,427 | 5/1899 | Stewalt et al. | 403/232.1 X |
| 666,918 | 1/1901 | Butz | 403/232.1 X |
| 828,488 | 8/1906 | Lanz | 403/232.1 X |
| 2,911,690 | 11/1959 | Sanford | 403/232.1 |
| 3,667,786 | 6/1972 | Cooper | 52/714 X |
| 4,005,942 | 2/1977 | Gilb | 403/190 X |
| 4,067,168 | 6/1978 | Thurner | 403/279 X |
| 4,192,118 | 3/1980 | Gilb | 52/714 |
| 4,353,664 | 10/1982 | Gilb | 52/702 X |
| 4,594,017 | 6/1986 | Hills | 403/232.1 X |
| 4,665,672 | 5/1987 | Commins et al. | 403/232.1 X |

FOREIGN PATENT DOCUMENTS 93998 5/1959 Norway ........................... 403/232.1

OTHER PUBLICATIONS

Alteck Industries, Inc.-advertisement, p. 9.
Basch Products, Inc.-advertisement.
Hull Metal and Supply-catalog, p. 7.
Hughes Manufacturing, Inc.-catalog, p. 1.

Primary Examiner—Randolph A. Reese
Assistant Examiner—Anthony Knight
Attorney, Agent, or Firm—James R. Cypher

[57] ABSTRACT

A bucket hanger and method of making the hanger from a sheet metal blank. The hanger is characterized by an elongated strap back member for attachment to a vertical member in a wood truss. The hanger has a single member, non-welded seat and overlapped back members of non-continguous lengths. Fasteners used to attach the hanger to the supporting truss serve the further function of interlocking the back members of the hanger and transferring load from a carried wood member through the shorter back member by means of metal to metal shear to the enlongated strap back member.

5 Claims, 10 Drawing Figures

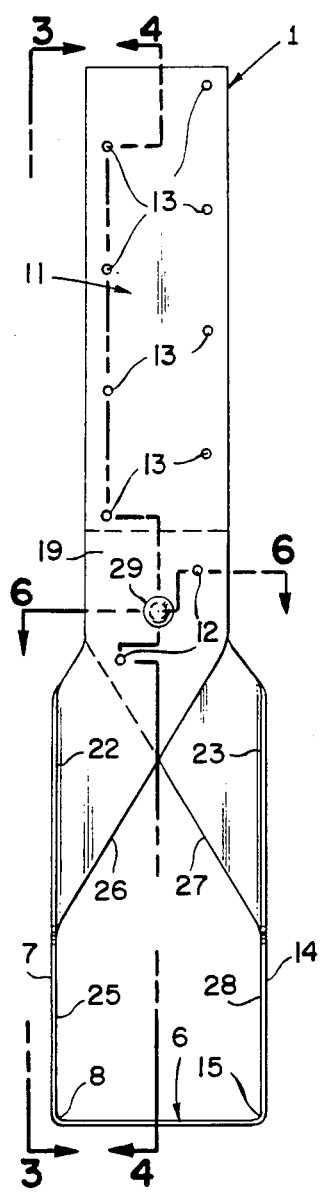
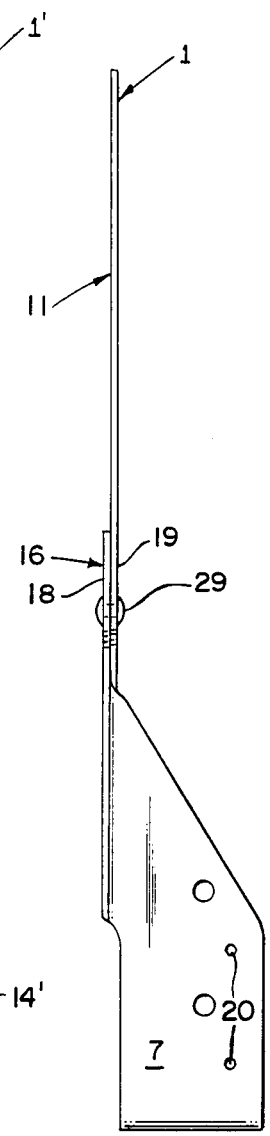
FIG. 2　　FIG. 2A　　FIG. 3
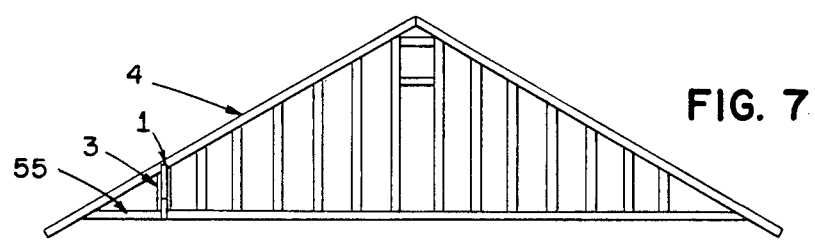
FIG. 7

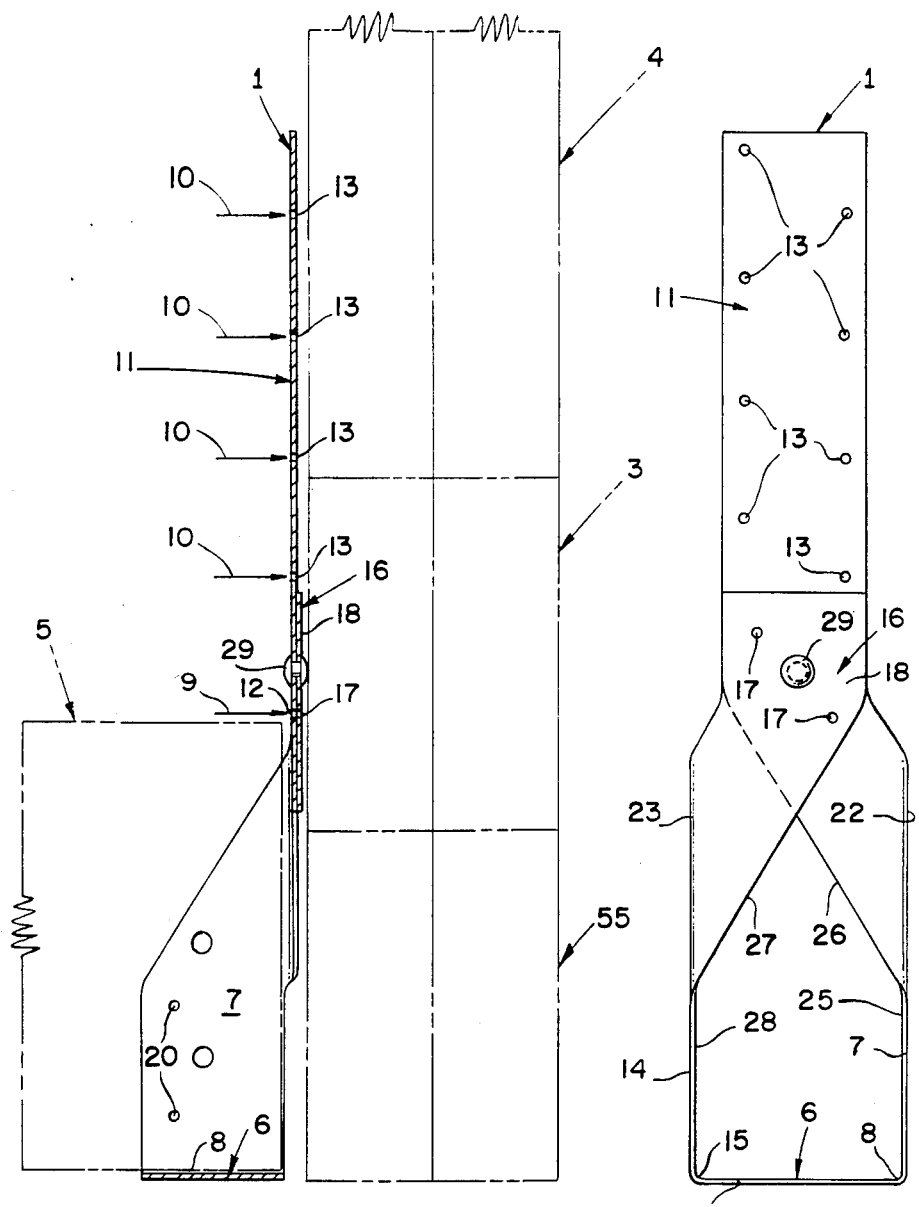
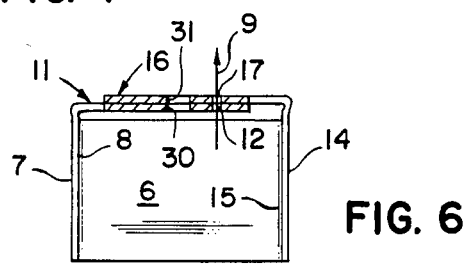
FIG. 4  FIG. 5  FIG. 6

BUCKET HANGER

BACKGROUND OF THE INVENTION

Simpson Strong-Tie Company, Inc., the assignee of this application is also the owner of copending application Ser. No. 06/714,616 filed Mar. 20, 1985 now U.S. Pat. No. 4,665,672 entitled ONEPIECE, NON-WELDED HOLDOWN.

This invention relates to sheet metal hangers which are used to connect wood joist members to wood roof trusses.

Structural engineers prefer that joist hangers for wood trusses be connected to the vertical members of the truss, rather than the bottom chord which is in tension. To meet this criteria, commercial companies have designed various hangers which have a long strap punched with a plurality of nail openings for attaching the hanger to the narrow truss vertical member. A seat and side members are connected to the strap and the hanger looks like a "bucket", hence the name "bucket hanger".

Several commercial companies have fabricated the "bucket hangers" from a plurality of sheet metal members and spot welded the parts together. This construction is expensive.

Most of the prior art hangers are fabricated so that the parts are connected in the seat area. This construction inherently results in a weak connector since the highest stress area is in the seat and most hanger failures occur in the welded area due to faulty welds or materials.

SUMMARY OF THE INVENTION

This application teaches the construction of a sheet metal hanger for connecting joist members to a wood supporting truss having a continuous single seat and the free ends overlapped and interlocked by attachment members which affix the hanger to the wood supporting truss.

In the preferred form, the hanger is galvanized steel; requires no welding in its fabrication or painting for protection.

In all of the standard sizes of the present invention, different seat width hangers can be constructed from the same blank.

The present application is unique in transferring load from one part of the hanger to another through the attachment fasteners thereby eliminating the need for welding, rivets or other means for attaching the free ends of the hanger.

In the preferred form of the invention, there is no back member adjacent the seat member thereby effecting a weight saving.

BRIEF DESCRIPTION OF THE DRAWINGS

FIG. 2 is a front elevation view of the hanger shown in FIG. 1.

FIG. 2A is a front elevation view of a modified form of the invention shown in FIG. 1.

FIG. 3 is a left side view of the hanger shown in FIG. 2 taken along line 3—3.

FIG. 4 is a left side elevation view of the hanger shown in FIG. 2 taken along line 4—4. The hanger illustrated is connected to a portion of a wood supporting truss illustrated in FIG. 7 and is carrying a joist member; both shown in phantom line.

FIG. 5 is a rear elevational view of the hanger shown in FIG. 2.

FIG. 6 is a cross sectional view of the hanger taken along line 6—6 in FIG. 2.

FIG. 7 is an elevation view of a supporting truss on a greatly smaller scale.

DESCRIPTION OF THE PREFERRED EMBODIMENTS OF THE INVENTION

Figure 1:
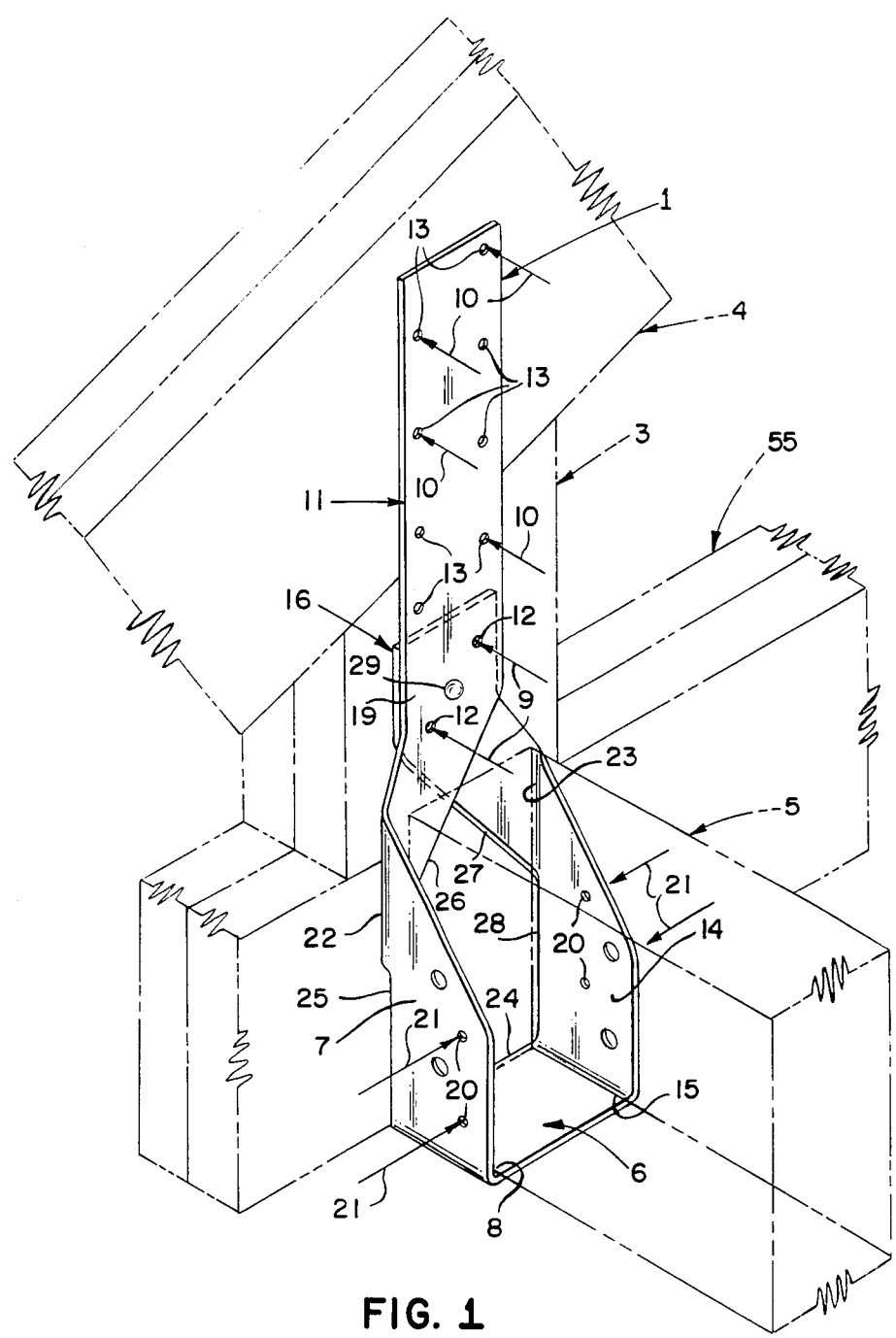
FIG. 1 is a perspective view of the hanger of the present invention. The hanger illustrated is connected to a portions of a wood supporting truss illustrated in FIG. 7 and is carrying a joist member; both shown in phantom line.
Figure 8:
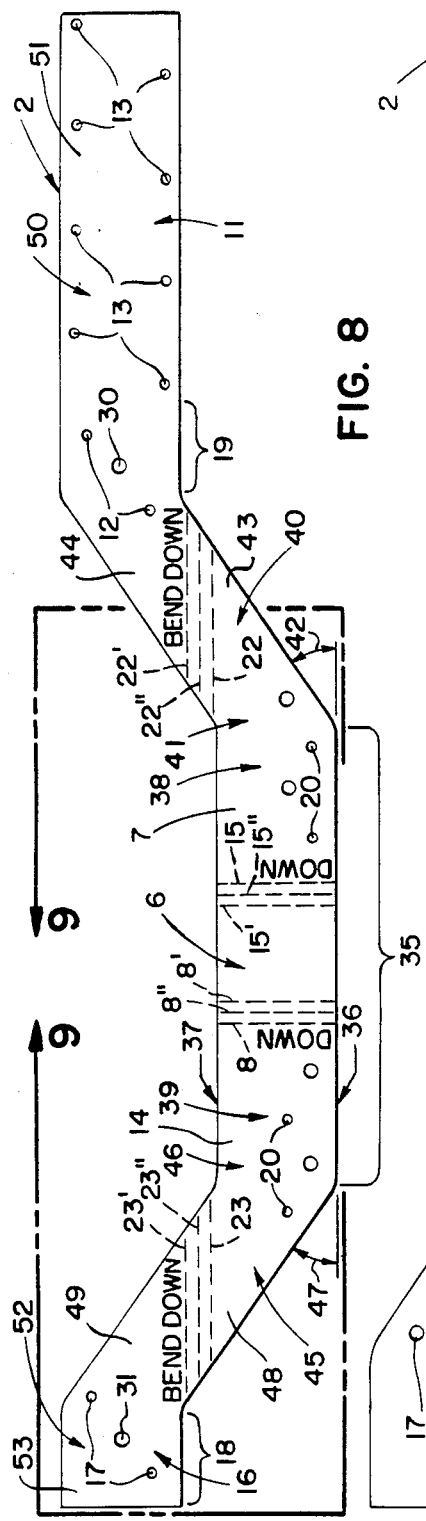
FIG. 8 is a plan view of a blank from which the hanger shown in FIG. 1 is constructed.

The sheet metal hanger 1 illustrated in FIG. 1 is constructed from a single blank member 2 illustrated in FIG. 8. The hanger 1 is formed by bending along substantially straight bend lines and is designed for attachment to a vertical portion 3 of a supporting wood member of a supporting wood truss 4 and for supporting a carried wood member 5.

The hanger consists briefly of a continuous non-overlapped single seat member 6 adapted for supporting the carried wood member; a first side member 7 integrally connected to a first portion 8 of the seat member and forming a generally right angle therewith; a plurality of attachment members 9 and 10 adapted for connection to the supporting wood member 3; a first back member 11 having a length substantially greater than the length of the seat integrally conected to the first side member and forming a generally right angle therewith and formed with spaced openings 12 and 13 adapted for receipt therethrough of the plurality of attachment members 9 and 10; a second side member 14 integrally connected to a second portion 15 of the seat member disposed on opposited sides of the seat opening and forming a generally right angle to the seat member, and the second side member 14 is generally parallel to the first side member 7; a second back member 16 integrally connected to the second side member 14 and forming a generally right angle therewith, and the second back member 16 is substantially parallel and closely adjacent to the first back member 11, and is formed with at least one opening 17 adapted for receiving the first attachment member 9, and at least a portion 18 of the second back member 16 overlaps a portion 19 of the first back member wherein the opening 17 in the overlapping portion of the second back member 16 is in alignment with at least one of the openings 12 in the first back member 11; and at least one of the plurality of attachment members 9 holds the first and second back members together and transfers the design load in shear substantially evenly to the first and second overlapped back members.

As shown in FIG. 1, the first back member 11 is substantially longer than the second back member 16. This is possible because fasteners 9 make a metal to metal interlock between the first and second back members and thereby transfer the load of the carried member to the attachment members 10 through the first back member 11. This unique transfer of load from one member of the hanger to the other through the attachment fasteners is unique and eliminates the need for welding, rivets or other method of joining the free ends of the hanger.

As shown in FIG. 1, first and second side members 7 and 14 extend a substantial distance above the seat member providing substantial side support to the carried member 5. Openings 20 in the first and second side members 7 and 14 are provided to receive fasteners 21 for attachment of the hanger to the carried member 5.

A feature of the present hanger is the weight saving effected over prior art hangers. Since it is structurally desirable to attach the hanger to the vertical members of the wood truss and to avoid any attachment to the bottom chord 55 of the truss which is in tension, the hanger of the present invention omits a substantial portion of the back member adjacent the seat. Since no attachment members are desirable in the bottom chord of the supporting member, no purpose is served by a back member in this area. Accordingly, first back member 11 is attached to first side meaber 7 along bend line 22 and second back member 16 is attached to second side member 14 along bend line 23 leaving a large opening as shown in FIG. 1 bounded by opening edges 24, 25, 26, 27 and 28.

In most instances, it is desirable to attach the ends of first and second back members 11 and 16 at the factory. As shown in FIG. 1, a rivet 29 may be inserted through openings 30 and 31 in first and second back members 11 and 16. A spot weld may be also used to join the first and second back members together. Since fasteners 9 ultimately hold the first and second back members together, it is immaterial in many applications whether the weld is permanent.

An important feature of the present invention is the fact that several hangers having different seat widths may be fabricated from the identical blank member. This is an important feature since it permits the partial fabrication of a number of standard blanks which then can be held in inventory until an order is received, at which time, hangers of the required size are completed.

A modified form of hanger is shown in FIG. 2A. The hanger shown in FIG. 2a has a seat 6' having a first width indicated by the lines 8', 15' in FIG. 9. The hanger shown in FIG. 2 has a seat 6 having a third width indicated by the lines 8, 15 in FIG. 9. Even though the seat widths are substantially different, both hangers are constructed from the identical blank shown in FIGS. 8 and 9. Like parts of the modified hanger illustrated in FIG. 2A are indicated by numbers followed by the (') prime symbol.

Figure 9:
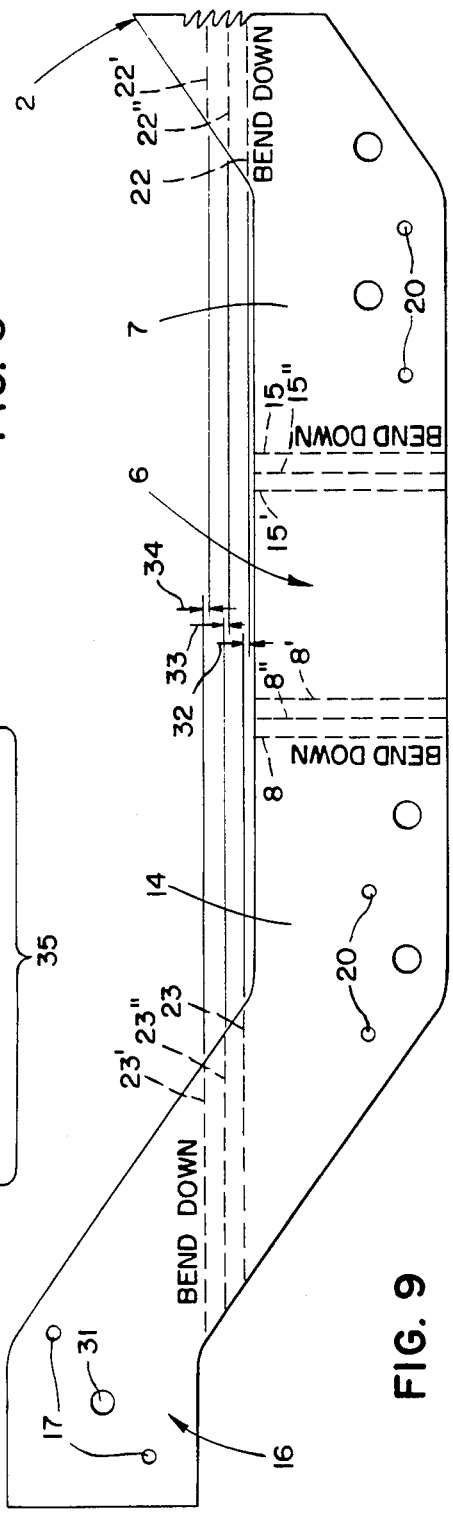
FIG. 9 is a plan view of a portion of the blank shown in FIG. 8 illustrated on an enlarged scale to more clearly show the features of the invention.

In order to construct the modified hanger shown in FIG. 2A, please also refer to FIGS. 8 and 9. The seat member 6' is formed from blank member 2 by bending downwardly along bend lines 8' and 15'. Next, first and second back members 11' and 16' are formed by bending downwardly along bend lines 22' and 23'. The back members are overlapped and joined by nails driven through openings 12'.

In like manner, the hanger shown in FIG. 2 is fabricated from the same blank member 2 shown in FIGS. 8 and 9. Seat member 6 having a third width indicated by the lines 8, 15 shown in FIG. 9 is formed by bending downwardly along bend lines 8 and 15. Next, first and second back members 11 and 16 are formed by bending downwardly along bend lines 22 and 23. The back members are overlapped and joined by rivet 29.

A third hanger, not shown in fabricated form and having a second seat width indicated by the lines 8', 15' in FIG. 9 may be constructed in the same manner as previously described by bending along bend lines 8'', 15'', 22'' and 23''.

In order to provide for overlap of the back members it should be noted in FIG. 9 that the series of bend lines 22 are not in alignment with bend lines 23. Instead, there is a small offset as designated by the double arrows 32, 33 and 34.

A method of fabricating one of a plurality of different seat width hangers from a single sheet metal blank includes the following steps:

(a) cutting a sheet metal blank 1 in the form of an unequal sided generally U-shaped form as illustrated in FIG. 8 including:
  (1) a base member indicated by the bracket line 35 having parallel lower and upper side edges 36 and 37 forming a plurality of seat members 6 and first portions of first and second side members generally indicated by arrows 38 and 39,
  (2) a first angled member generally indicated by arrow 40 joining the base member 35 at a first end generally indicated by arrow 41 at a first angle indicated by double arrow 42 and forming a second portion 43 of the first side member 7, and a first portion 44 of a first back member 11,
  (3) a second angled member generally indicated by arrow 45 joining the base member 35 at a second end generally indicated by arrow 46 at a second angle indicated by double arrow 47 substantially equal to the first angle 42 and forming a second portion 48 of the second side member 14, and a first portion 49 of a second back member 16,
  (4) a first extension member 50 connected to the first angled member 40 and disposed parallel to the base member 35 and forming a second portion 51 of the first back member 11, and
  (5) a second extension member 52 connected to the second angled member 45 and disposed parallel to the base member 35 and forming a second portion 53 of the second back member 16;

b. dividing the base member 35 into a plurality of seat members having progressively increasing widths bounded by pairs of disposed parallel seat bend lines at right angles to the length of said base member 35;

c. marking the first angled member 40 with a first series of disposed bend lines 22, 22', and 22'' at generally right angles to the parallel seat bend lines;

d. marking the second angled member 45 with a second series of disposed bend lines 23, 23' and 23'' parallel but offset from the first series of bend lines 22, 22' and 22'';

e. bending the base member 35 along a selected pair of the disposed seat bend lines at right angles to the base member 35 forming parallel first and second side members 7 and 14;

f. bending the first extension member 50 along a selected line of the first series of disposed bend lines 22, 22' or 22'' at a generally right angle to the first angled member 40; and g. bending the second extension member 52 along a selected line of the second series of disposed bend lines 23, 23', and 23'' at a generally right angle to the second angled member 45 thereby overlapping said first and second back members 11 and 16.

I claim:

1. A sheet metal hanger constructed from a single member and formed by bending along subtantially straight bend lines for attachment to a vertical portion of a supporting wood member and for supporting a wood carried member, said hanger comprising:

a. a continuous non-overlapped single seat member adapted for supporting said carried wood member;

b. a first side member integrally connected to a first portion of said seat member and forming a generally right angle therewith;

c. a plurality of attachment members adapted for connection to said supporting wood member;

d. a first back member having a length substantially greater than the length of said seat integrally connected to said first side member and forming a generally right angle therewith and formed with spaced openings adapted for receipt therethrough of at least one of said plurality of attachment members;

e. a second side member integrally connected at a right angle to a second portion of said seat member and side members being disposed on opposite sides of said seat to form an opening and said second side member is generally parallel to said first side member;

f. a second back member integrally connected to said second side member and forming a generally right angle therewith, and said second back member is substantially parallel and closely adjacent to said first back member, and is formed with at least one opening adapted for receiving at least one of said plurality of attachment members, and at least a portion of said second back member overlaps a portion of said first back member wherein said opening in said overlapping portion of said second back member is in alignment with at least one of said openings in said first back member; and g. at least one of said plurality of attachment members holds said first and second back members together and transfers said design load in shear substantially evenly to said first and second overlapped back members.

2. A hanger as described in claim 1 comprising:
a. said first and second back members are substantially unequal in length.

3. A hanger as described in claim 2 comprising:
a. said first and second side members are formed with fastener openings and said back members extend from initial points substantially above said seat member.

4. A hanger as described in claim 3 wherein:
a. said aligned openings in said first and second back members are joined by a rivet member.

5. A method of fabricating one of a plurality of different seat width hangers from a single sheet metal blank comprising the steps of:

a. cutting a sheet metal blank in the form of an unequal sided generally U-shaped form including:
  (1) a base member having parallel lower and upper side edges forming a plurality of seat members and first portions of first and second side members,
  (2) a first angled member joining said base member at a first end at a first angle and forming a second portion of said first side member, and a first portion of a first back member,
  (3) a second angled member joining said base member at a second end at a second angle substantially equal to said first angle and forming a second portion of said second side member, and a first portion of a second back member,
  (4) a first extension member connected to said first angled member and disposed parallel to said base member and forming a second portion of said first back member, and
  (5) a second extension member connected to said second angled member and disposed parallel to said base member and forming a second portion of said second back member;

b. dividing said base member into a plurality of seat members having progressively increasing widths bounded by pairs of disposed parallel seat bend lines at right angles to the length of said base member;

c. marking said first angled member with a first series of disposed bend lines at generally right angles to said parallel seat bend lines;

d. marking said second angled member with a second series of disposed bend lines parallel but offset from said first series of bend lines;

e. bending said base member along a selected pair of said disposed seat bend lines at right angles to said base member forming parallel first and second side members;

f. bending said first extension member along a selected line of said first series of disposed bend lines at a generally right angle to said first angled member; and g. bending said second extension member along a selected line of said second series of disposed bend lines at a generally right angle to said second angled member thereby overlapping said first and second back members.

* * * * *